United States Patent

[11] 3,630,593

| [72] | Inventors | John Lester Bartelt<br>Maplewood;<br>Robert Kyran Curran, Stirling, both of N.J. |
|---|---|---|
| [21] | Appl. No. | 35,633 |
| [22] | Filed | May 8, 1970 |
| [45] | Patented | Dec. 28, 1971 |
| [73] | Assignee | Bell Telephone Laboratories Incorporated<br>Murray Hill, N.J. |

[54] HOLOGRAPHICALLY PRODUCED IMAGE ARRAYS FOR PHOTOLITHOGRAPHY
3 Claims, 4 Drawing Figs.

| [52] | U.S. Cl. | 350/3.5, 96/36.2 |
|---|---|---|
| [51] | Int. Cl. | G02b 27/00 |
| [50] | Field of Search | 300/3.5; 96/36.2 |

[56] References Cited
UNITED STATES PATENTS

| 3,296,594 | 1/1967 | Van Heerden | 350/3.5 |
|---|---|---|---|
| 3,529,887 | 9/1970 | Sun Lu | 350/3.5 |
| 3,582,177 | 6/1971 | Kiemle | 350/3.5 |
| 3,540,791 | 11/1970 | Caulfield et al. | 350/3.5 |
| 3,506,327 | 4/1970 | Leith et al. | 350/3.5 |

OTHER REFERENCES

Meier, Jour. of the Optical Society of America, Vol. 55 No. 8, Aug. 1965, pp. 987– 992

*Primary Examiner*—David Schonberg
*Assistant Examiner*—Ronald J. Stern
*Attorneys*—R. J. Guenther and Edwin B. Cave ABSTRACT: This disclosure describes the generation of multiple identical images holographically. Wavefronts from a unit pattern and a pinhole array separately illuminated by branched, spatially filtered and collimated laser beams are Fourier-transformed and focused in front of a holographic medium. Illumination of the developed hologram with a laser beam conjugate to the wavefront from one of the pinholes produces a spaced array of real images of the unit pattern. The process is useful in photomask making, or as a way to directly expose photoresist in silicon device manufacture.

3,630,593

READING MODE

FRONT VIEW OF DATA ARRAY MASK

PINHOLE MASK

HOLOGRAPHICALLY PRODUCED IMAGE ARRAYS FOR PHOTOLITHOGRAPHY

FIELD OF THE INVENTION

This invention relates to multiple optical imaging; and specifically concerns forming of multiple identical images holographically for particular use in photomask making and allied processes.

BACKGROUND OF THE INVENTION

Multiple image formation in photomask fabrication is achieved typically by step-and-repeat techniques or by a multiple lens camera. Either approach, however, has its disadvantages. The step-and-repeat process is mechanical, and hence image-positioning errors random in nature and potentially cumulative can occur. Additionally, step-and-repeat operations are inherently time consuming. Multiple-lens cameras overcome the latter, but require lenses of the highest optical quality and uniformity to avoid image distortion.

Accordingly, one object of the invention is to eliminate step-and-repeat operations in mask fabrication.

A broad object of the invention is to produce multiple identical images from a unit image without expensive multiple-lens cameras.

A further object of the invention is to achieve independent controls over the size and the spacing of the produced images.

A still further object of the invention is to make possible the direct projection exposure of photoresists without first having to produce the usual photomask.

SUMMARY OF THE INVENTION

Pursuant to one aspect of the invention, a hologram is made by passing optical energy from a laser beam through a unit pattern and, in a separate branch, through a pinhole array mask. Both branches are thereafter Fourier-transformed and projected on a light sensitive plate or other recording medium just behind the focal plane. Prior to recording, both branches may be spatially filtered to eliminate at least any significant zero spatial frequency component. The transformation and filtering, prior to recording, yields the further advantage of eliminating additional noise due to nonlinearities in the recording media.

The wave fronts recorded in the hologram are reconstructed by placing the developed hologram in a spatially filtered, partially collimated laser beam conjugate to the wave front from one of the pinholes. An array of real images of the unit pattern is produced, the images being identical in relative position and number to the pinhole pattern. A plane can be found in the diffracted beam in which the entire multiple image array is focused sharply into real images. These can be used to produce a mask, or to directly expose photoresist to produce final images without need for contact or projection masks.

Additionally, with relatively simple geometric controls, the reconstructed images can be magnified or reduced and their size or spacing varied, thus affording versatility in choice of image characteristics.

The invention and its further objects, features and advantages will be clear from a reading of the description to follow of an illustrative embodiment thereof.

THE DRAWING

DETAILED DESCRIPTION OF AN ILLUSTRATIVE EMBODIMENT

Figure 1:
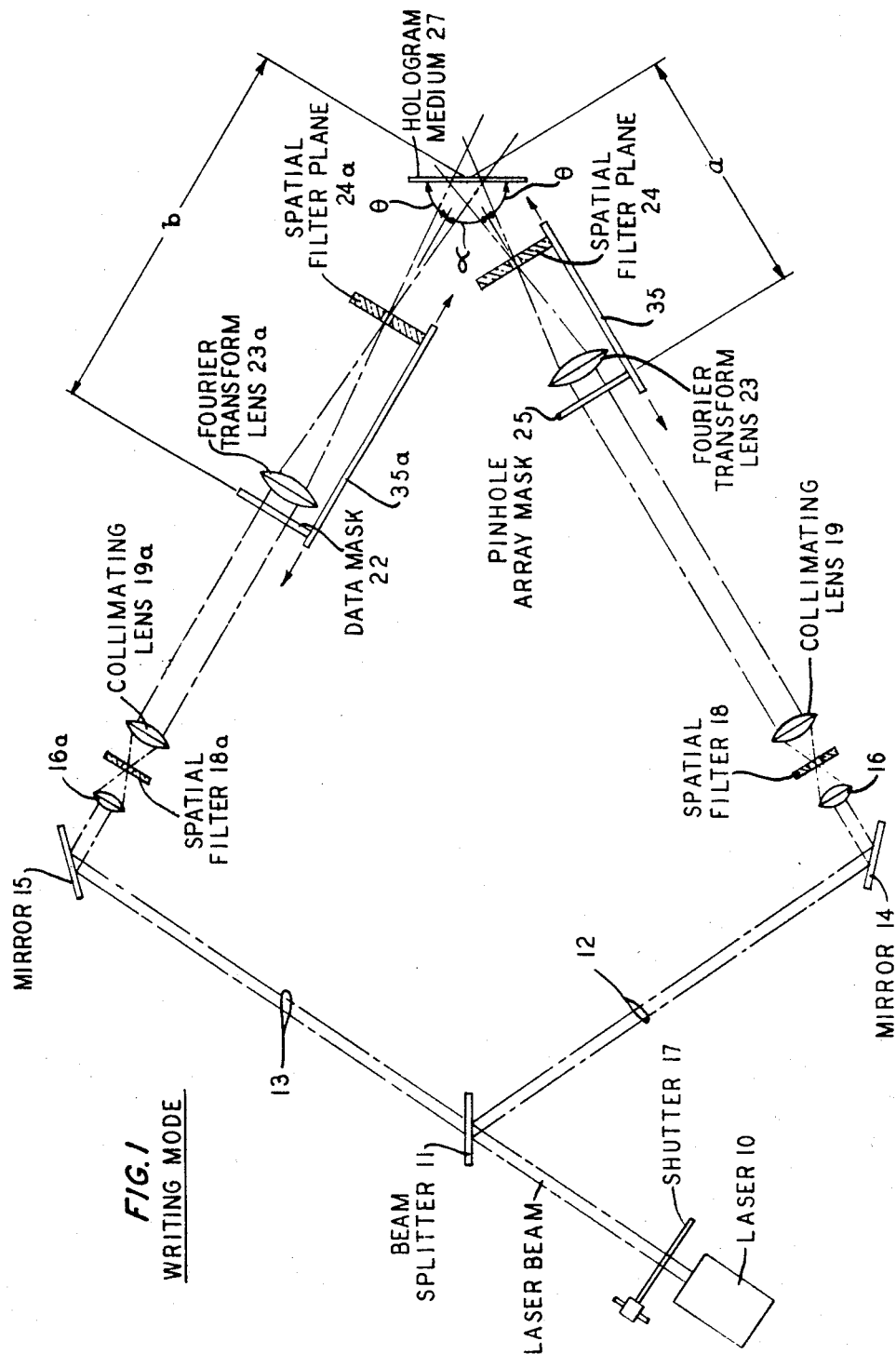
FIG. 1 is a schematic diagram of a simplified optical system for producing holograms capable of yielding multiple images pursuant to the invention.

As seen in FIG. 1, a beam from laser 10 is split by beam splitter 11 into the usual reference and object beams 12, 13, which are deflected by mirrors 14, 15 respectively. Beam 13, the object beam, is focused by lens 16a through a spatial filter 18a, in preparation for collimating. The beam is then collimated by lens 19a. Likewise, beam 12 is focused by lens 16 through spatial filter 18 and then collimated by lens 19. A shutter 17 provides on-off control of the beam from laser 10. Filters 18 and 18a are standard pinhole filters.

Figure 3:
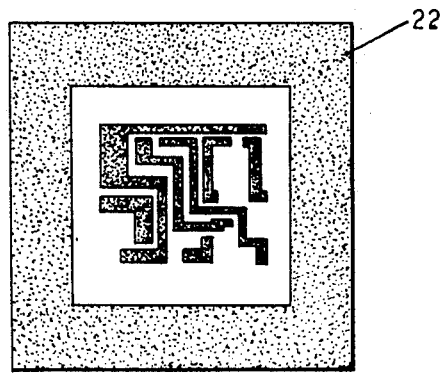
FIG. 3 is a sketch in top view of a unit pattern produced from suitable artwork.

Beam 13 passes through the data mask 22 which may, for example, comprise a reduced-size photographic image of a mask pattern as depicted in FIG. 3. Advantageously, thereafter, lens 23a provides a spatial Fourier-transform of the beam 13 at its back focal plane. The object beam 13 then is spatially filtered by filter 24a disposed at the back focal plane of lens 23a. Filter 24a is, for example, a simple on-axis absorbing, 12 micron dot formed on a semitransparency.

Figure 4:
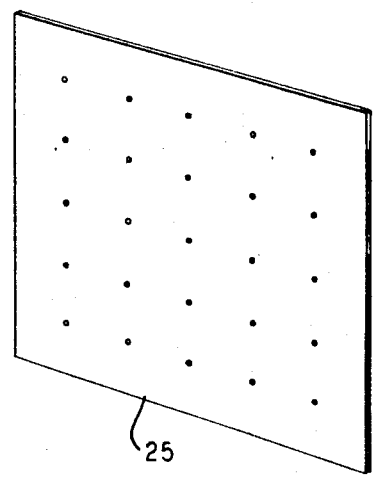
FIG. 4 is a diagram of a pinhole mask.

The reference beam 12, after spatial filtering and collimating passes through a pinhole array mask 25 depicted in FIG. 4. Following passage through mask 25, the reference beam 12 is Fourier-transformed by lens 23, and spatially filtered by filter 24 which is similar to filter 24a. The beams 12, 13 thereafter are brought to a focus in front of a phase hologram medium 27 to produce a near-Fourier transform hologram. The path lengths between beam splitter 11 and hologram 27 are maintained the same to assure spatial coherence.

Lens 23a is typically a convex lens which produces a quadratic-phase delay in an incident plane wave front. Such lenses produce in their back focal planes approximate two-dimensional Fourier-transforms of the spatial frequencies present in transparencies illuminated in the front focal plane or in the plane of the lens itself. In this embodiment, the mask 22 is such a transparency. Lens 23 has properties similar to those of lens 23a.

The pinholes of mask 25 are, for example, circular voids in a thin metal film. The film is, for example, a 1,500 A. thick deposit of molybdenum or chromium on a glass substrate. Typically, the pinholes are 25 microns in diameter. The film thickness ought not to exceed the pinhole diameter, as a rule. The metal film edges defining the circular voids must be smooth and sharp. The center-to-center spacing of pinholes is, for example, 10 mils; and is determined by the final image separation required. It will be appreciated that the array need not be square in configuration. Both pinhole diameter and spacing can be held to tolerances of 0.1 mil by conventional photolithographic techniques. Other mask structures may be used, such as a pattern of precision drilled holes in plastic or metal thin sheet stock.

Spatial filtering with the filter 24, 24a is desirable because the optical densities of photoemulsion and of some chromium masks are not great enough to prevent the unwanted presence of a significant zero spatial frequency component, i.e., a DC signal in the Fourier-transform. This, and other spatial frequency components not stemming from the unit pattern information represent noise and unwanted signal. With more complex spatial filters, other unwanted spatial frequencies can be eliminated if desired.

It is possible to form a hologram from the interfering wave fronts emanating from the masks 22, 25 without performing the Fourier-transform and spatial filtering described. The resulting holograms are unsatisfactory in that they have low reconstruction efficiency and reconstructions from these holograms have significant noise introduced by requiring the use of a larger dynamic range of the recording media, all of which are increasingly nonlinear with increasing dynamic range of the light pattern to be recorded. For the same reason, it is necessary even when Fourier-transforming the pinhole and data mask generated wave fronts to spatial-filter out the zero frequency component using filters 24, 24a.

To obtain maximum reconstruction efficiencies, the hologram formed is preferably a phase hologram. In such holograms there is little or no loss of the energy of an illuminating beam. Efficiencies of diffraction as high as 90 percent are thus obtained. One suitable phase hologram material is dichromated gelatin. The material chosen must have sufficiently broad range of frequency response to record at least a frequency equal to the sum of the basic carrier frequency of the Fourier-transformed beam and the highest spacial frequency in the data mask image.

The angle of intersection of the reference and object beams, denoted $\alpha$ in FIG. 1, determines the spacing between adjacent interfering regions in the holographic medium. Conventionally, angle $\alpha$ is adjusted to achieve a spacing between recorded interference fringes of about 0.5 micrometers which is well within that permitted by the resolving power of the medium.

Figure 2:
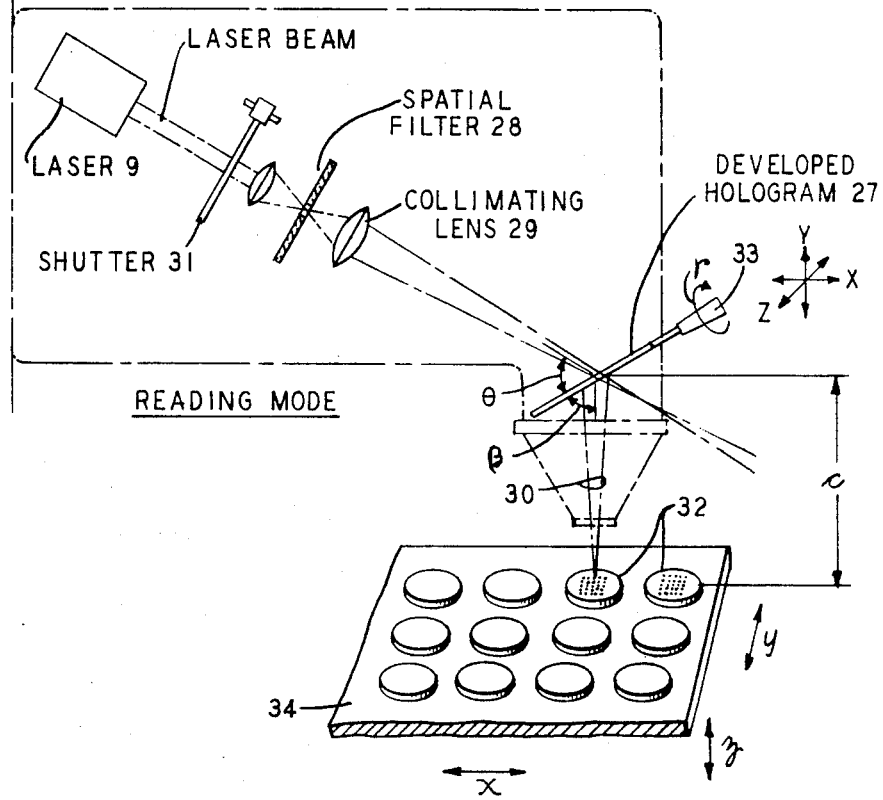
FIG. 2 is a schematic diagram illustrating reconstruction of the holographically recorded multiple images directly into photoresist on devices on a wafer.

The angle $\theta$ in FIG. 1 made by either the reference beam or the object beam with respect to the hologram surface, termed the Bragg angle, determines the angle at which the reconstruction is done, as in FIG. 2, provided the same wavelength light is used in reconstruction. The diffraction angle $\beta$ in FIG. 2 is equal to the angle $\theta$ of FIG. 1.

Reconstruction of the wave fronts recorded in medium 27 is achieved in general by illuminating the developed hologram with a spatially filtered, partially collimated laser beam conjugate to the wave front from a selected one of the pinholes. The selection of the particular wave front to which the illuminating laser beam is to be conjugate is not critical. Illumination produces an array of real images of the unit pattern, identical in relative position and number to the pinholes of the pinhole array 25.

The particular reconstruction apparatus shown in FIG. 2 comprises the essential parts of a holographic projection camera which, as shown, exposes photoresist directly on devices under manufacture. Alternatively, the camera may be used to produce a photomask for later contact work. The developed hologram 27 is illuminated with a beam from laser 9 that has been spatially filtered by filter 28 and partially collimated by lens 29. The partial collimation is such that the laser beam incident on the hologram is converging. Exposure time is controlled, for example, by a shutter 31. The hologram is supported in a slide support 33 for easy change and positioning. It is necessary for support 33 to be fully adjustable in rotation, as denoted by the arrow "$r$," as well as adjustable in X-Y-Z space.

Within the diffraction beam 30, a plane can be found in which the entire multiple image array comes into focus. The devices or photomask are disposed in that plane. The devices being produced on the silicon wafers, such as wafer 32, have center-to-center spacing which coincide with the center-to-center spacing of the real unit pattern images produced by the diffracted beam 30. It will be appreciated that alignment of all devices may be achieved with a single-alignment operation of each wafer with respect to the unit pattern images. This may be facilitated by including registration marks in the unit pattern corresponding to marks placed with respect to the devices. A table such as 34 normal to the wavepath of beam 30 and capable of movement in X- and Y-directions provides an adequate surface for handling of successive wafers.

Advantageously, a wide latitude of choice is afforded for the image position. The reconstructed images can also be magnified or reduced by the same mechanism, which simply involves control of the distance $a$ and $b$ in FIG. 1 and distance $c$ in FIG. 2. Specifically, a reduction or magnification of the spacing between patterns is effected by varying the value of the ratio $a/c$. The size of pattern is controlled by varying the value of the ratio $b/c$. The two controls are effectively mutually independent. The setting of distance $a$ is made, advantageously, by mounting pinhole mask 25 on an axially moveable carriage 35 along with the associated lens 23 and filter 24. Similarly, distance $b$ is set by mounting data mask 22, lens 23a and filter 24a on a carriage 35a. Similarly, the setting of distance $c$ is achieved by adjusting of the collimating lens 29 or the hologram support 33. This would require that table 34 be readjusted. The flexibility of focal length is an advantage not shared with alternate multiple imaging expedients, such as fly's eye lens and step-and-repeat equipment.

Using standard bar test patterns and a reduction factor of 4:1 to produce 10 by 10 1-inch masks, $4\mu$ lines have been observed in reconstructed images of the present invention. The method is thus capable of producing most currently used photomasks. Resolution of $4\mu$ lines is not necessarily the highest resolution attainable; resolution of the reconstructed image is determined by the characteristics of the hologram recording medium 27 of FIG. 1 and the size of the pinholes in the mask of FIG. 4.

Due to off-axis aberrations, however, there is a practical limit to the area size within which sharp identical real images may be focused. Thus, wafers or mask patterns exceeding 2 inches in diameter are not amenable to the present process of the required resolutions are less than $5\mu$. In the silicon technology presently served by step-and-repeat equipment, where wafers are approximately 1 inch in diameter, the present invention finds useful employment. If the required resolution is of the order 1 mil, a workpiece about 4 inches by 5 inches may be served by the present invention, making it to this extent useful also in large scale integration.

The spirit of the invention is embraced in the scope of the claims to follow.

We claim:

1. Method of producing from a unit pattern multiple identical images in a photosensitive medium, comprising the steps of:

forming a multiple-imaging phase hologram by interference of coherent light from said unit pattern with a reference beam directed through a spaced pinhole array by effecting, with separate lenses disposed after said unit pattern and said pinhole array, Fourier-transforms of the wave fronts emanating from said unit pattern and from said pinhole array, spatially filtering said transforms so as to remove the zero spatial frequency component, near-Fourier-transform plane of said lenses;

illuminating the developed hologram with a laser beam conjugate to the wave front from one of the pinholes;

controlling the spacing between said real images by controlling the ratio $a/c$ where $a$ is the distance between said hologram and said pinhole array and $c$ is the distance between said medium and the developed said hologram measured along the diffracted beam;

controlling the size of said real images by controlling the ratio $b/c$ where $b$ is the distance between said hologram and said unit pattern; and projecting the resulting diffracted beam and real images onto said photosensitive medium.

2. Method pursuant to claim 1 wherein said unit pattern is a photomask pattern and said photosensitive medium is a photomask.

3. Method pursuant to claim 1 wherein said unit pattern comprises circuit paths and said photosensitive medium is a photoresist-coated semiconduction device in manufacture.

* * * * *